(12) United States Patent
Chang et al.

(10) Patent No.: US 12,443,061 B2
(45) Date of Patent: Oct. 14, 2025

(54) OPTICAL DEVICE WITH PHASE-CHANGE MATERIALS AND METHOD OF FABRICATING THE SAME

(71) Applicant: TAIWAN SEMICONDUCTOR MANUFACTURING COMPANY LTD., Hsinchu (TW)

(72) Inventors: Kuo-Pin Chang, Hsinchu County (TW); Kuo-Ching Huang, Hsinchu (TW); Yu-Wei Ting, Taipei (TW); Hung-Ju Li, Hsinchu (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 0 days.

(21) Appl. No.: 18/473,211

(22) Filed: Sep. 23, 2023

(65) Prior Publication Data
US 2025/0102839 A1    Mar. 27, 2025

(51) Int. Cl.
*G02F 1/035*    (2006.01)
(52) U.S. Cl.
CPC .................. *G02F 1/035* (2013.01)
(58) Field of Classification Search
CPC ......... G02F 1/035; G02F 1/011; G02F 1/0147
See application file for complete search history.

(56) References Cited

U.S. PATENT DOCUMENTS 6,424,755 B1 * 7/2002 Clapp .................... G02F 1/035
385/9
10,509,244 B1 * 12/2019 Shank ................... G02F 1/0147
2023/0221490 A1 * 7/2023 Bhaskaran ............. G02B 6/122
385/11

(Continued)

FOREIGN PATENT DOCUMENTS

CN    115917408 A    4/2023
CN    116736438 A    9/2023

(Continued)

OTHER PUBLICATIONS

J. W. Silverstone, D. Bonneau, J. L. O'Brien and M. G. Thompson, "Silicon Quantum Photonics," in IEEE Journal of Selected Topics in Quantum Electronics, vol. 22, No. 6, pp. 390-402, Nov.-Dec. 2016, doi: 10.1109/JSTQE.2016.2573218.

(Continued)

*Primary Examiner* — Thanh Luu
*Assistant Examiner* — Mai Thi Ngoc Tran
(74) *Attorney, Agent, or Firm* — WPAT LAW; Anthony King

(57) ABSTRACT

One embodiment of the present disclosure provides an optical device which includes a waveguide and a light modulator. The light modulator comprising a bridge segment positioned on the waveguide, wherein the bridge segment comprises a phase-change material. The optical device also includes a heating member. The heating member includes an intermediate segment and two electric contact segments. The intermediate segment is in direct contact with the bridge segment of the light modulator. The two electric contact segments are connected to two ends of the intermediate segment, wherein heat produced from the heating member is directly transferred to the bridge segment of the light modulator thereby inducing a phase transition thereof.

20 Claims, 15 Drawing Sheets

(56) References Cited

U.S. PATENT DOCUMENTS

2023/0417810 A1* 12/2023 Guillet De Chatellus ..................
                                                        G01J 3/1256
2023/0418090 A1* 12/2023 Li ........................ G02B 27/286

FOREIGN PATENT DOCUMENTS

| TW | 202038475 A | 10/2020 |
| TW | 202117375 A | 5/2021 |

OTHER PUBLICATIONS

English Abstract of TW 202117375 A.
English Abstract of TW 202038475 A.
English Abstract of CN 116736438 A.
US 20230221490 A1 is the US counterpart of CN 115917408 A.

* cited by examiner

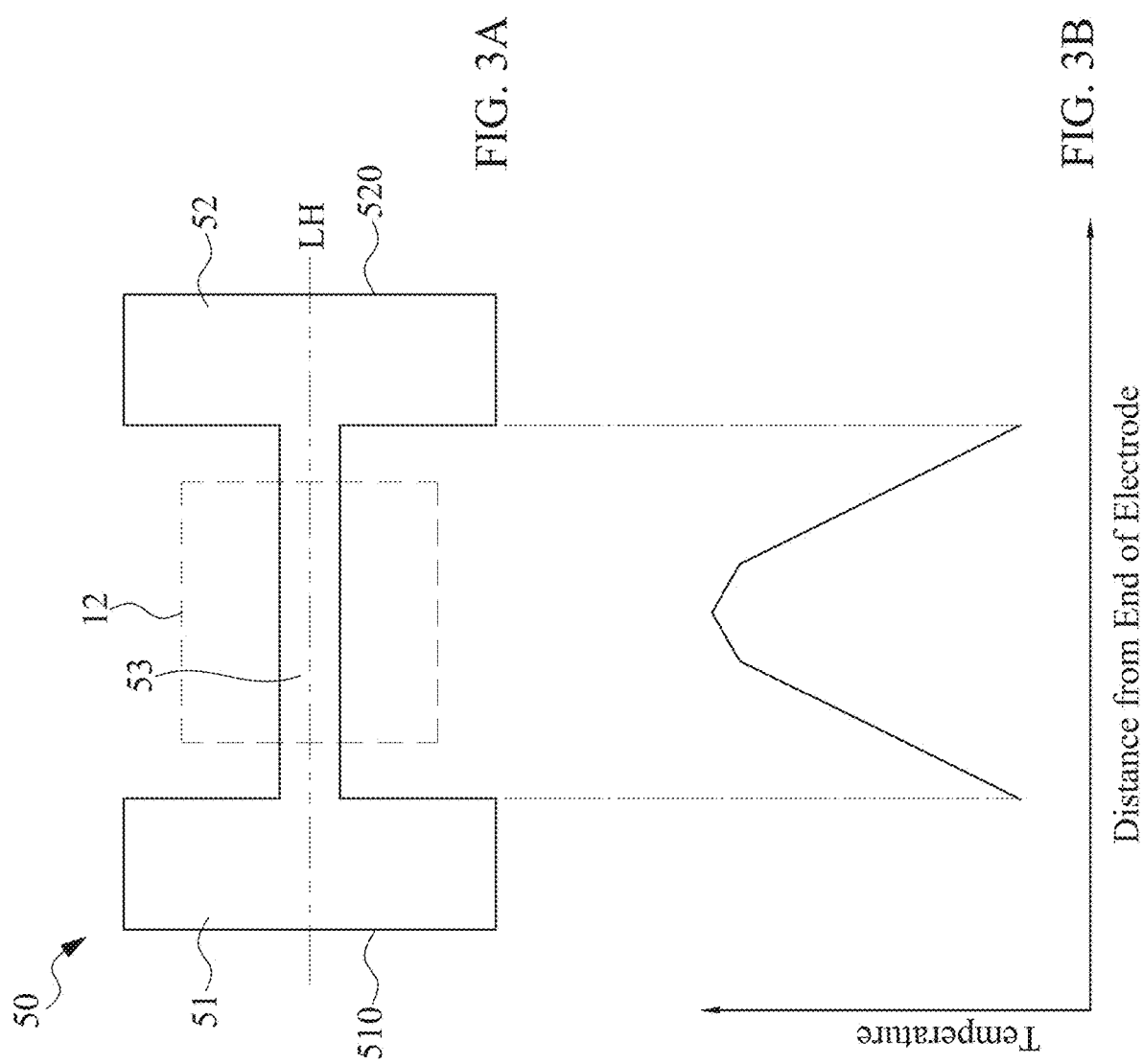

S10

- S11: form a waveguide extending along the optical axis, wherein the optical device has a first zone, a second zone, and a third zone arranged in order along a direction that is perpendicular to the optical axis of the waveguide
- S12: form a layer of phase-change material on the waveguide, wherein an outer surface of the waveguide relative to the second zone is covered by the layer of phase-change material
- S13: form a heating member that extends from the first zone and terminates at the third zone by passing through the second zone, wherein a segment of the heating member formed in the second zone is in direct contact with the layer of phase-change material

FIG. 12

OPTICAL DEVICE WITH PHASE-CHANGE MATERIALS AND METHOD OF FABRICATING THE SAME

BACKGROUND

The growth of the internet and network traffic rate is pushing a demand for optical-based data communication. Optical signals are usable for high speed and secure data transmission between two devices. Many of optical devices used in the optical-based data communication systems may be fabricated in semiconductor devices, and may be further integrated as a silicon photonic integrated chips (PIC) for high-speed optical interconnects. Optical modulation is a process of modifying light waves according to high-frequency electrical signals that contain information so as to realize the transmission of data and information through optical communication channels like optical fiber or waveguides in the form of light signals.

Although existing tool for optical modulation have been generally adequate for their intended purposes, they have not been entirely satisfactory in all respects. Consequently, there is a need to improve the efficiency and reliability of optical modulation for data and information transmission.

BRIEF DESCRIPTION OF THE DRAWINGS

Aspects of the embodiments of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

FIG. 3A is a schematic view of a heating member, in accordance with one or more embodiments of the present disclosure.

FIG. 3B is a diagram illustrating a temperature distribution on the heating member of FIG. 3A during its operation.

FIG. 12 is a flowchart illustrating a method of fabricating an optical device, in accordance with one or more embodiments of the present disclosure.

DETAILED DESCRIPTION

Figure 1:
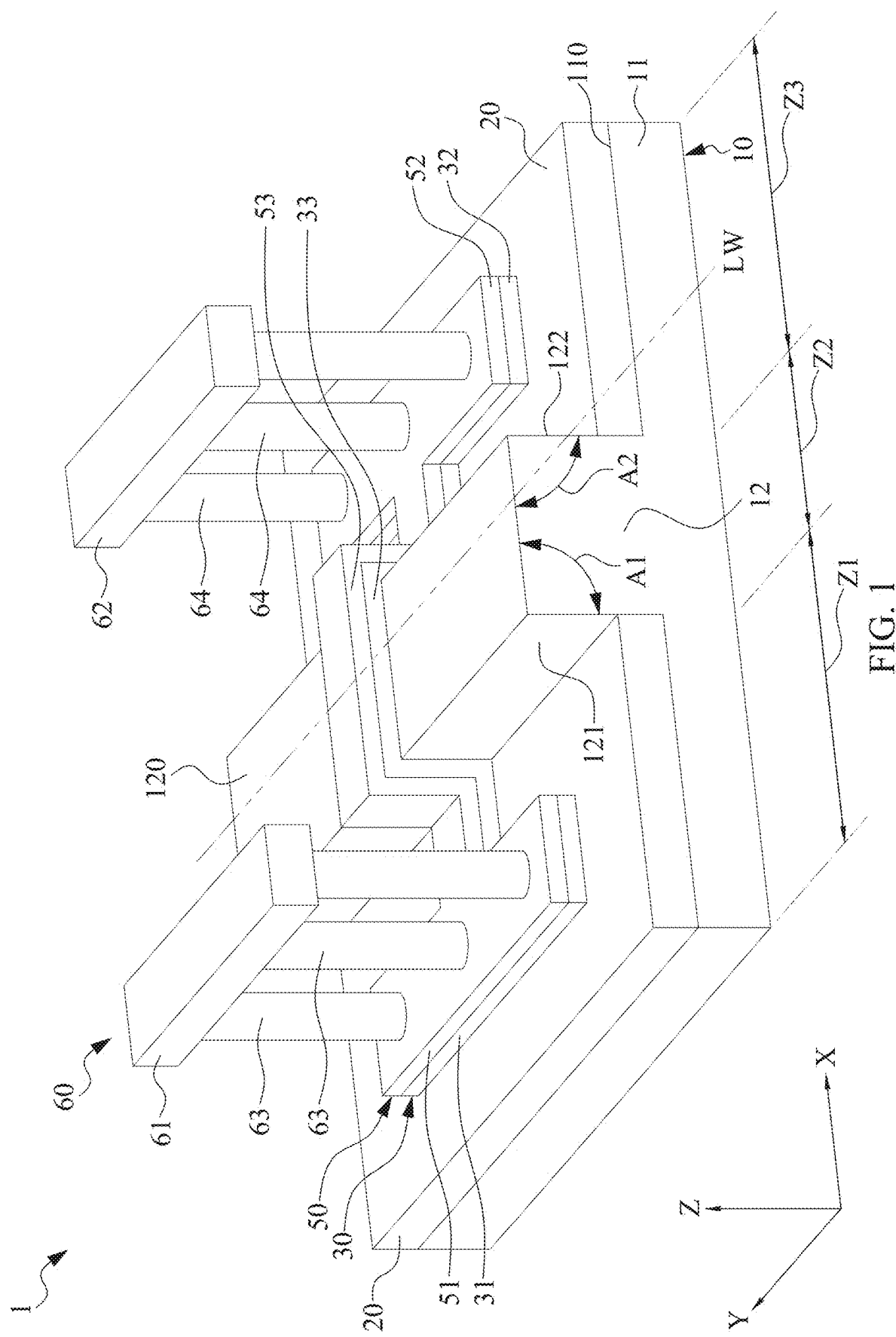
FIG. 1 is a schematic view of an optical device, in accordance with one or more embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation.

Optical modulation allows one to control an optical wave or to encode information on a waveguides. Controlling the travel and propagation of light in the waveguides involves manipulating the flow of light through the waveguide structure, whereby data can be stored, processed, and retrieved in the photonic device. Embodiments of the present disclosure provide an optical device including a layer of phase-change materials (PCM) and a heating member that is direct in contact with the layer of the PCM. The layer of PCM which absorbs or reflects light in a waveguide is directly controlled by the thermal energy provided by the heating member, and therefore the thermal loss is significantly minimized, enabling precise and effective control of the PCM based on the preset program.

FIG. 1 is a schematic view of an optical device 1, in accordance with one or more embodiments of the present disclosure. In accordance with some embodiments, the optical device 1 includes a waveguide 10, two cladding layers 20, a light modulator 30, a heating member 50, and an electrical connecting unit 60. It would be appreciated that some structures of the optical device, such as structure surrounding the heating member 50 and the electrical connecting unit 60, are not illustrated for clarity of discussion. Furthermore, the features described below can be replaced or eliminated in other embodiments of the optical device 1.

The waveguide 10 is a structure used for guiding the flow of electromagnetic wave in a direction parallel to its optical axis LW, confining it to a region either within or adjacent to its surfaces. In some embodiments, as shown in FIG. 1, the optical device 1 has a first zone Z1, a second zone Z2, and a third zone Z3 arranged in order along a traversal direction (X-axis direction). The traversal direction is perpendicular to the optical axis LW.

In the embodiment shown in FIG. 1, the waveguide 10 is a silicon photonic rib waveguide and includes a base portion 11 and a rib portion 12. The base portion 11 may be formed on an insulation layer (not shown in the figures), which is made with silicon oxide and is formed on a silicon substrate (not shown in the figures). The rib portion 12 extends from a top surface 110 of the base portion 11 relative to the second zone Z2. In one exemplary embodiment, the rib portion 12 has a rectangular cross-section and includes multiple planes 120, 121 and 122 on its outer surface. For illustration purposes, the plane 120 is hereinafter referred to as top plane, and the planes 121 and 122 are hereinafter referred to as side planes.

The top plane 120 is located at a side of the rib portion 12 that is farthest away from the base portion 11. The side planes 121 and 122 are located at two opposite sides of the rib portion 12 and connect the top plane 120 to the top surface 110 of the base portion 11. The top plane 120 and the side planes 121 are connected with an included angle A1 and the top plane 120 and the side planes 122 are connected with an included angle A2. The included angle A1 and A2 may be both right angle (i.e., 90 degrees.) However, it will be appreciated that many variations and modifications can be made to embodiments of the disclosure. In some other embodiments, the included angle A1 and A2 is greater than 90 degrees. In some other embodiments, the top plane 120 is connected with each of the side planes 121 or 122 with a fillet.

The dimensions of the rib portion 12 and the base portion 11 may be determined according to the application of the optical device 1. For example, in case where the rib portion 12 has a larger cross-sectional area relative to the base portion 11 may produce advantages such as low coupling loss between an optical fiber and the waveguide, but light with multiple polarization states can be passed through. In some exemplary embodiments, in cases where the width of the rib portion 12 is below about 800 nm, silicon photonic rib waveguide will be single mode for each polarization. However, it will be appreciated that many variations and modifications can be made to embodiments of the disclosure. Waveguide with different geometries may be used in the optical device of the present disclosure. For example, the waveguide may be a non-planar waveguide and have a circular or rectangular cross-section.

Two cladding layers 20 are configured to reduce the optical loss of light propagating through the waveguide 10. In some embodiments, the two cladding layers 20 are formed on the top surface 110 of the base portion 11 of the waveguide 10. As shown in FIG. 1, since the two cladding layers 20 both have a thickness lower than the height of the rib portion 12, a lower region of each of the side planes 121 and 122 are covered by the two cladding layers 20, but a upper region of each of the side planes 121 and 122 are exposed by the two cladding layers 20. The material of the cladding layers 20 have a lower refractive index than the waveguide 10—in other words, light travels slower through the waveguide 10 than through the cladding layers 20. The wave in the cladding layer 20 decays very rapidly for evanescent waves. In one exemplary embodiment, the waveguide 10 is made of pure silica or silicon nitride ($Si_3N_4$) with a high refractive index and the cladding layers 20 are made of silica-based material, such as silicon oxide ($SiO_2$), which has lower refractive index. It would be appreciated that, while not illustrated in FIG. 1, there may be another cladding layer (not shown in figures) which covers the rib portion 12 of the waveguide 10 and the cladding layers 20. In addition, there may be another cladding layer positioned underneath the waveguide 10.

The light modulator 30 is configured to regulate the light beam propagating through the waveguide 10. In some embodiments, as shown in FIG. 1, the light modulator 30 includes a layer of phase-change material (PCM) formed over the waveguide 10 and extending, along the X-axis direction, from the first zone Z1 through the second zone Z2 to the third zone Z3 of the optical device 1. In some embodiment, the light modulator 30 includes two extension segments 31 and 32 located in the first zone Z1 and the second zone Z2, respectively. The two extension segments 31 and 32 are positioned on the two cladding layers 20 so that they are distant away from the top surface 110 of the base portion 11.

Furthermore, the light modulator 30 includes one bridge segment 33 connected between the two extension segments 31 and 32. A portion of the bridge segment 33 is directly in contact with the outer surface of the waveguide 10 that is exposed by the cladding layers 20. For example, the top plane 120 and the upper regions of the two side planes 121 and 122 of the waveguide 10 are covered by the bridge segment 33, and there is absence other material between the portion of the bridge segment 33 and the top plane 120, the side plane 121 or the side plane 122 of the waveguide 10. Through this arrangement, light passing through the region of the waveguide 10 covered by the light modulator 30 will be sufficiently modulated by the microcavity (e.g., enhanced absorption or refraction). However, it should be noted that many variations and modifications can be made to embodiments of the disclosure. In cases where the waveguide is a non-planar optical waveguide, such as circular optical fibers, an outer surface of the waveguide that is exposed by the cladding layer is surrounded by the light modulator in all transverse directions.

Figure 7:
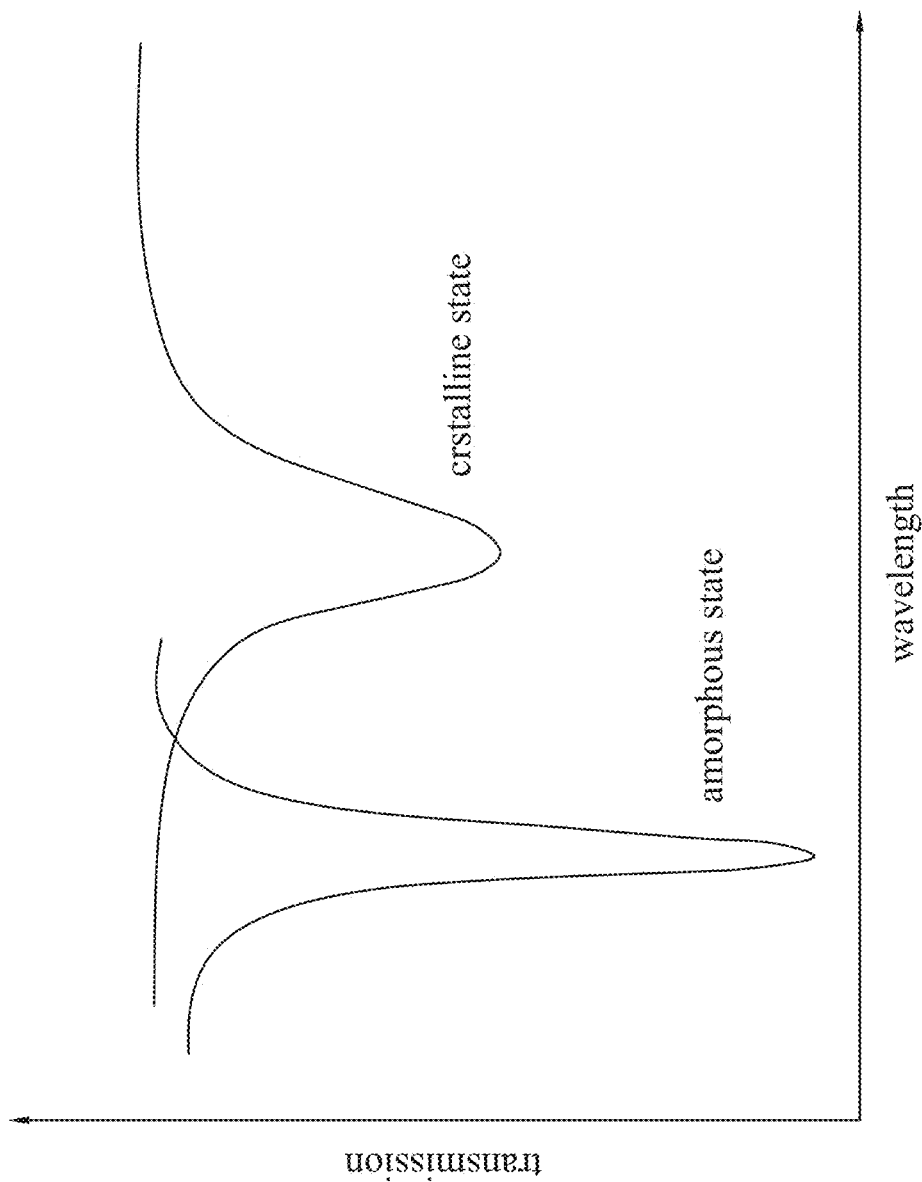
FIG. 7 is a transmission versus wavelength graphs of one phase-change material in different structural phases.

The phase-change material of the light modulator 30 can be rapidly and reversibly switched between an amorphous state and a crystalline state, wherein the optical and electronic properties of the amorphous state and the crystalline state differ tremendously. The ability to switch rapidly between two states with different properties qualifies these materials for applications in optical modulation. For example, FIG. 7 illustrates how a phase-change material on top of a waveguide can be programmed to the amorphous state and the crystalline state and subsequently read out as a change in transmission of the waveguide relative to light with different wavelengths. The transmission is defined as the ratio between output and input optical intensity. The phase-change material may include GeTe, Ge$_2$Sb$_2$Te$_5$ (GST), Ge$_2$Sb$_2$Se$_4$Te$_1$ (GSST), Sb$_2$S$_3$, or Sb$_2$Se$_3$, or the like.

The heating member 50 is configured to produce heat in response to the application of electrical pulses provided by the electrical connecting unit 60 due to the Joule heating effect. In the embodiment that the light modulator 30 includes extension segments 31 and 32, as shown in FIG. 1, the heating member 50 is conformally formed on the light modulator 30. The heating member 50 has a high thermal conductivity, e.g., between about 100 watts per meter-kelvin (W/(m–k)) and about 400 W/(m–k), such that the heating member 50 functions as a heat sink for the light modulator 30. The heating member 50 is a copper foil, in the illustrated embodiment, although other metal foil comprising a suitable material, such as gold, tungsten, aluminum, silver the like, or combinations thereof, may also be used. A thickness of the metal foil is between about 10 μm and about 50 μm, such as 30 μm, although other dimensions are also possible.

The electrical connecting unit 60 includes a first metal pad 61, a second metal pad 62, and multiple contacts 63 and 64. A first set of one or more contacts 63 extends downward from the first metal pad 61 to an electric contact segment 51 of the heating member 50 (e.g., to the cathode of the heating member 50) to couple the first metal pad 61 to the heating member 50. A second set of one or more contacts 64 extends downward from the second metal pad 62 to an electric contact segment 52 of the heating member 50 (e.g., to the anode of the heating member 50) to couple the second metal pad 62 to the heating member 50. It would be appreciated that the number and the arrangement of the metal pads and the contacts of the electrical connecting unit 60 should not be limited to the embodiments shown in FIG. 1 and can be varied according to different demands. For example, the contacts 63 and/or the contacts 64 may be arranged on the heating member 50 along a line that is parallel to the optical axis LW of the waveguide 10.

FIGS. 2A-2D illustrate various stages in an optical device fabrication process, in accordance with one or more embodiments of the present disclosure. While methods are described as a series of acts, it will be appreciated that the order of the acts (and/or portions of those acts) may be altered in other embodiments. Further still, while FIGS. 2A-2D illustrate a specific series of acts, some acts that are illustrated and/or described may be omitted in other embodiments. Further, additional acts that are not illustrated and/or described in FIGS. 2A-2D may be included in other embodiments.

Figure 2A:
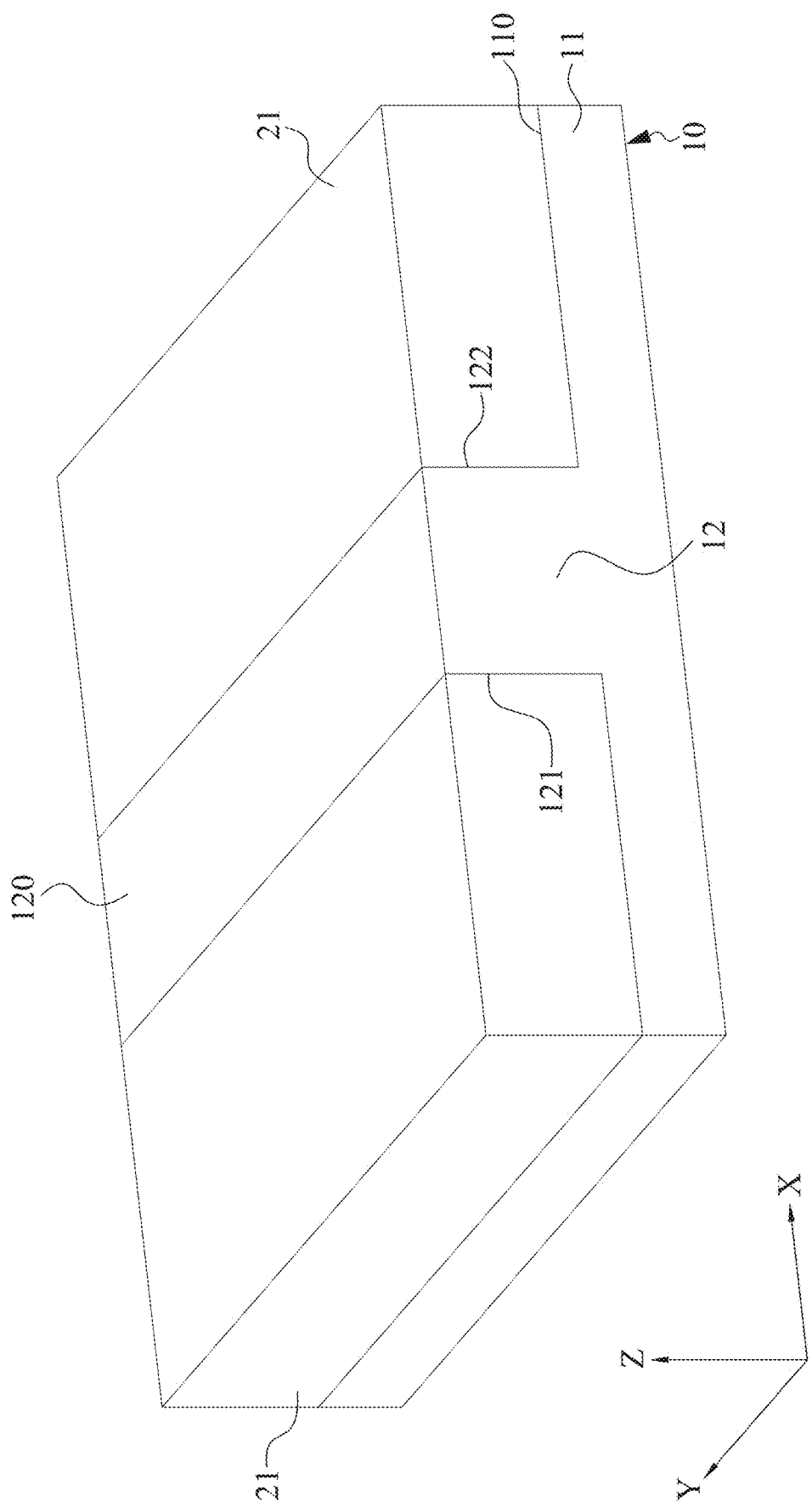
FIGS. 2A-2D illustrate various stages in an optical device fabrication process, in accordance with one or more embodiments of the present disclosure.

In some embodiments, as shown in FIG. 2A, the method of fabricating the optical device 1 includes forming the waveguide 10 and forming a layer of silica-based material 21 overlying the waveguide. The layer of silica-based material 21 may be formed on the waveguide 10 through deposition. The deposition may, for example, be performed by atomic layer deposition (ALD), vapor deposition, or some other suitable deposition process. In some embodiments, the silica-based material includes silicon oxide (SiO$_2$). Optionally, a chemical mechanical planarization (CMP) operation is carried out to planarize an upper surface of the layer of silica-based material 21 with the top plane 120 of the waveguide 10.

Figure 2B:
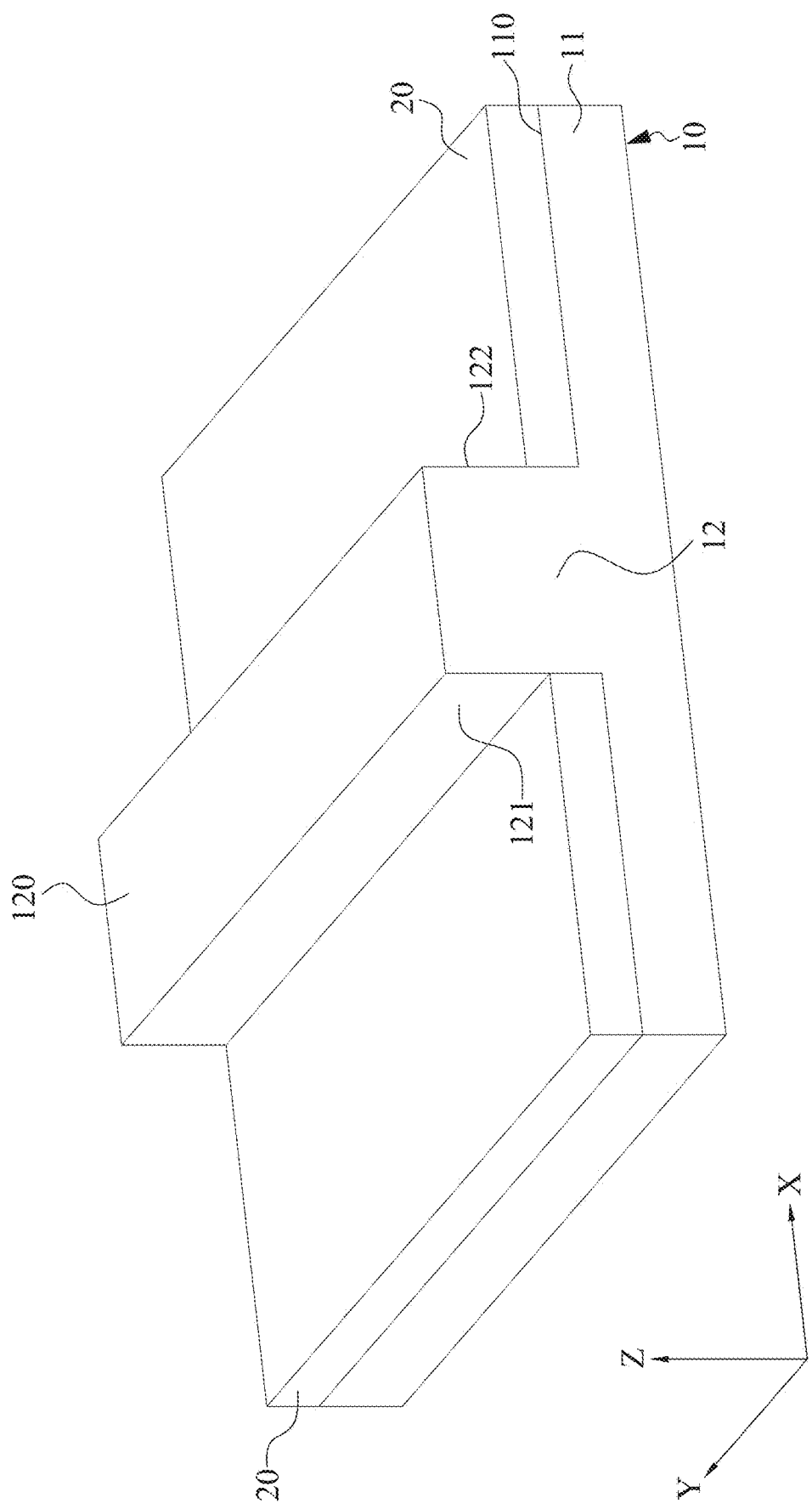

After the formation of the layer of silica-based material 21, as shown in FIG. 2B, the method of fabricating the optical device 1 includes removing a portion of the layer of silica-based material 21 to expose a portion of side planes 121 and 122 of the rib portion 12. Any suitable amount of material may be removed from the layer of silica-based material 21. The amount removed can be tailored by applying different etchant at various etching conditions. The removing operation may include forming a photoresist layer or a capping layer (such as an oxide capping layer) over the top plane 120 of the rib portion 12, patterning the photoresist or capping layer to have openings that expose the regions of the layer of silica-based material 21 relative to the first and the second zones Z1 and Z2 (FIG. 1), and etching a portion of the layer of silica-based material 21 so as to get two cladding layers 20. In the depicted embodiment, the layer of silica-based material 21 is etched by a dry etching process. Alternatively, the etching process is a wet etching process, or combination dry and wet etching process.

Figure 2C:
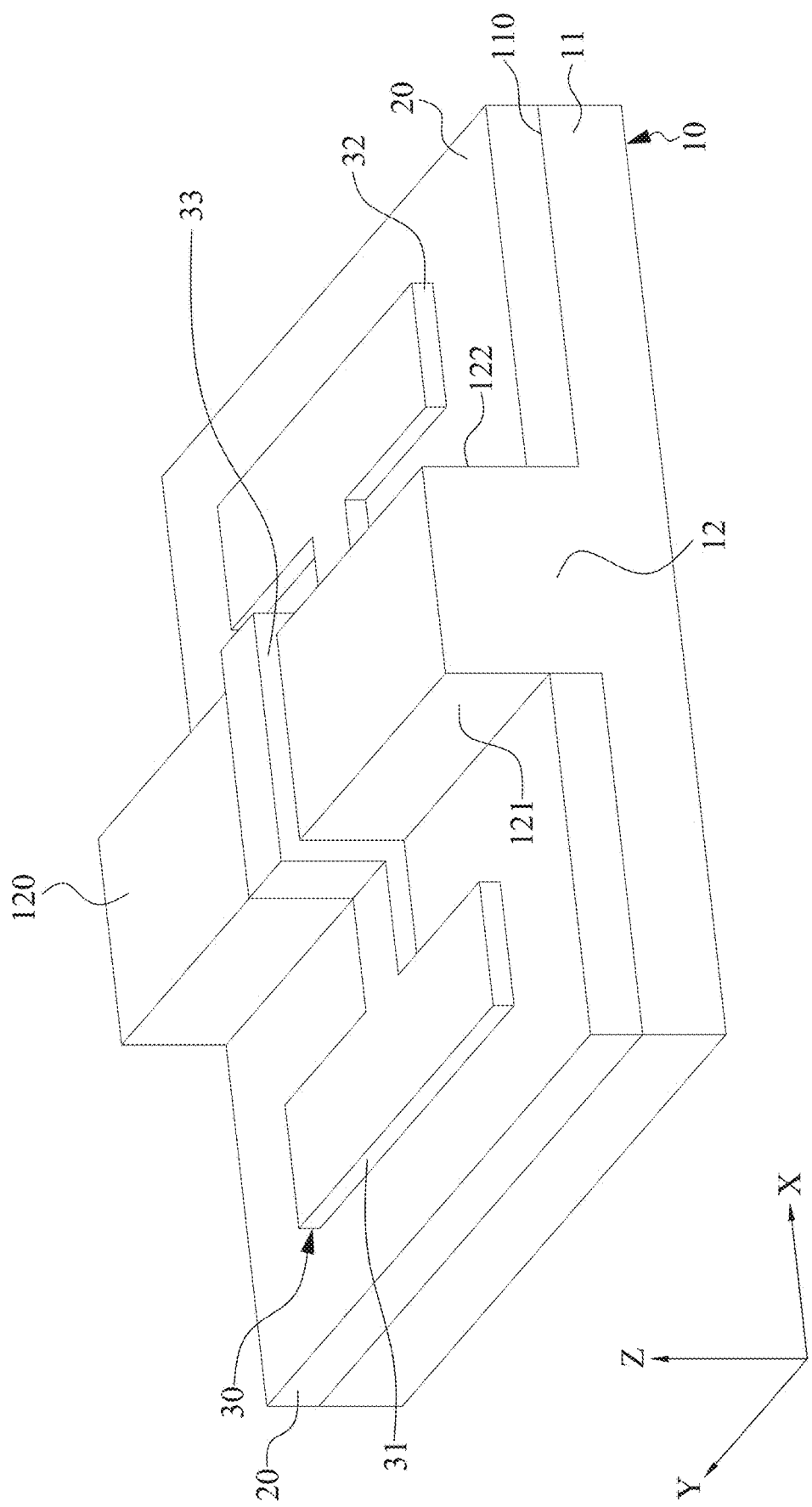

After the formation of the two cladding layers 20, as shown in FIG. 2C, the method of fabricating the optical device 1 includes forming the light modulator 30 over the waveguide 10. The formation of the light modulator may include forming (e.g., depositing) a layer of phase-change material on the two cladding layers 20 and the outer surface of the waveguide 10 exposed by the two cladding layers 20, such as the top planes 120 and the side planes 121 and 122 of the waveguide 10. The deposition may, for example, be performed by atomic layer deposition (ALD), vapor deposition, or some other suitable deposition process. After the formation of the layer of phase-change material, the layer of phase-change material is patterned by a photolithography/etching process so as to form the light modulator 30.

In some embodiments, the phase-change material of the light modulator 30 is an electrically conductive material, which allows electrical currents supplied from the electrical connecting unit 60 to pass through the extension segments 31 and 32 and the bridge segment 33, heating up the light modulator 30 by Joule heating effect. Many exemplary embodiments of the present disclosure to fabricate an electrically conductive are provided. For example, the layer of phase-change material may be subjected to an annealing process after it is deposited over the waveguide. During the annealing, the dislocations and crystal defects could recover, therefore reducing the defect concentration and strengthening the atomic lattice vibration, which enhances the conductivity. Alternatively or additionally, the light modulator 30 may be formed with phase-change material with higher electrical conductivity, such as GeTe.

Figure 2D:
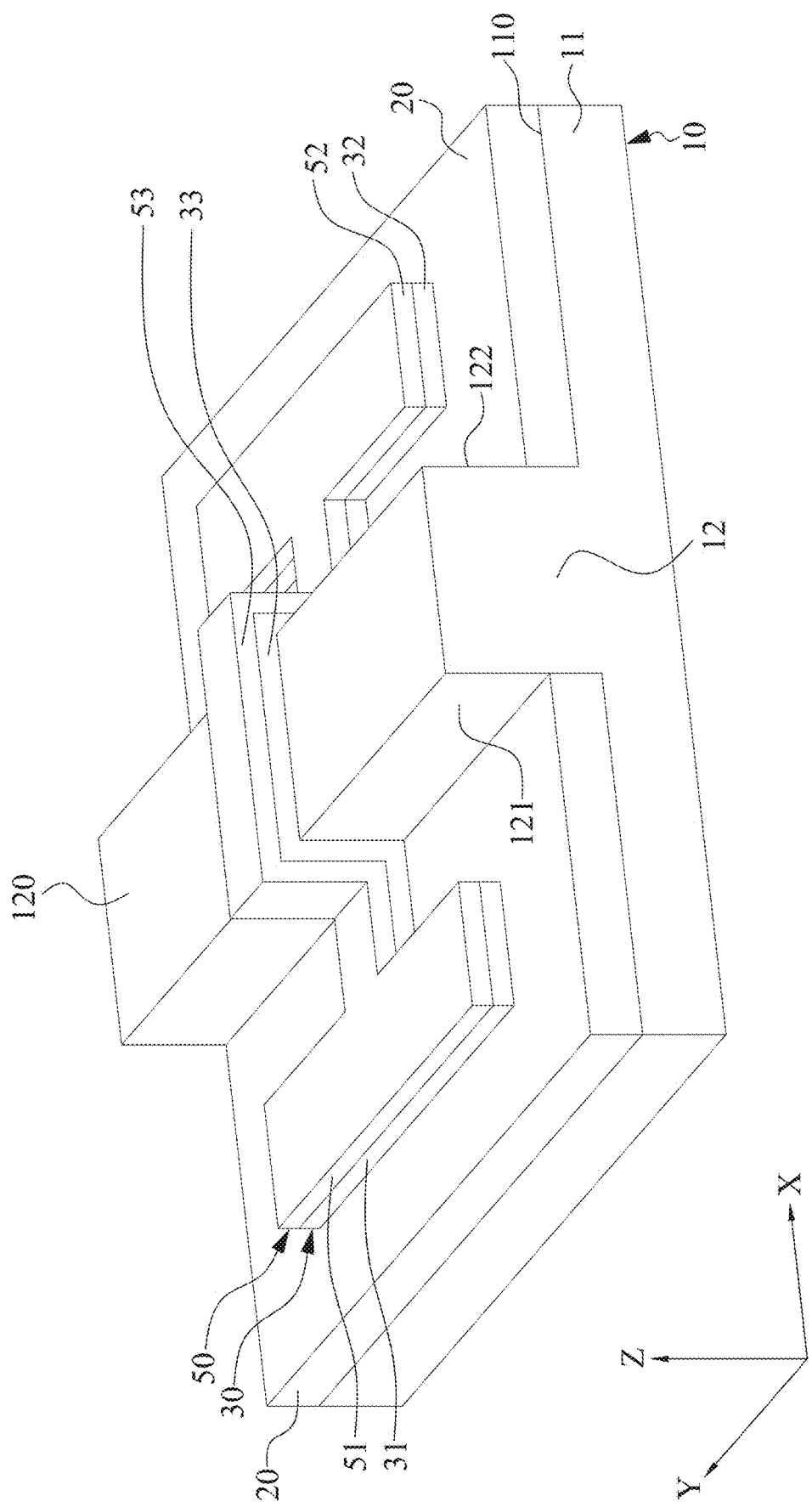

After the formation of the light modulator 30, as shown in FIG. 2D, the method of fabricating the optical device 1 includes forming the heating member 50 over the light modulator 30. The formation of the heating member may include forming (e.g., depositing) a layer of thermal conductive material on the two cladding layers 20, the light modulator 30 and the outer surface of the waveguide 10 exposed by the cladding layers 20 and the light modulator 30. The deposition may, for example, be performed by atomic layer deposition (ALD), vapor deposition, or some other suitable deposition process. After the formation of the layer of thermal conductive material, the layer of thermal conductive material is patterned by a photolithography/etching process so as to form the heating member 50.

In some embodiments, as shown in FIG. 2D, the heating member 50 conformally covers the light modulator 30, and the side walls of the light modulator 30 flush with the side walls of the heating member 50. As a result, the light modulator 30 and the thermal heating member 50 may be patterned by the same process. However, it will be appreciated that many variations and modifications can be made to embodiments of the disclosure. In some other embodiments, the two extension segments 31 and 32 of the light modulator 30 are omitted, the heating member 50 is formed after the formation of the light modulator 30. In such alternative embodiment, the electric contact segments 51 and 52 of the heating member 50 are in direct contact with the cladding layers 20.

After the formation of the heating member 50, the method of fabricating the optical device 1 also includes forming the electrical connecting unit 60 over the heating member 50, as shown in FIG. 1, and forming the other cladding layer (not shown in figures) surrounding the rib portion 12 of the waveguide 10 and the electrical connecting unit 60.

In some embodiments, as shown in FIG. 3A, the two electric contact segments 51 and 52 are positioned at two ends 510 and 520 of the heating member 50 and arranged along a longitudinal axis LH. The intermediate segment 53 is connected between two electric contact segments 51 and 52 and is in contact with the rib portion 12 of the waveguide 10. In some embodiments, the intermediate segment 53 has a uniform width and thickness in a traverse direction that is perpendicular to the longitudinal axis LH of the heating member 50. The width of the intermediate segment 53 is less than a width of the two electric contact segments 51 and 52, such that the intermediate segment 53 has a higher current density than that of the two electric contact segments 51 and 52 when electrical pulse is applied to the heating member 50. The higher current density represents higher temperature. As a result, as shown in FIG. 3B, the heating member 50 has the highest temperature in the central region (i.e., region the bridge segment 33 of the light modulator 30 is connected) and gradually decreases in temperature towards the ends (i.e., two electric contact segments 51 and 52.)

In the embodiment where the heating member 50 and the light modulator 30 are conformally formed and both electrically conductive, electrical current passes through the light modulator 30 from the extension segment 31, through the bridge segment 33, and to the extension segment 32. As a result, the light modulator 30 exhibits a similar thermal profile to that of the heating member 50. However, due to Joule heating effects and thermal heat transferred from the heating member, the light modulator 30 achieves a higher temperature than the heating member 50. This approach may reduce energy consumption while achieve the desired structural phase change of the phase-change material.

Figure 4:
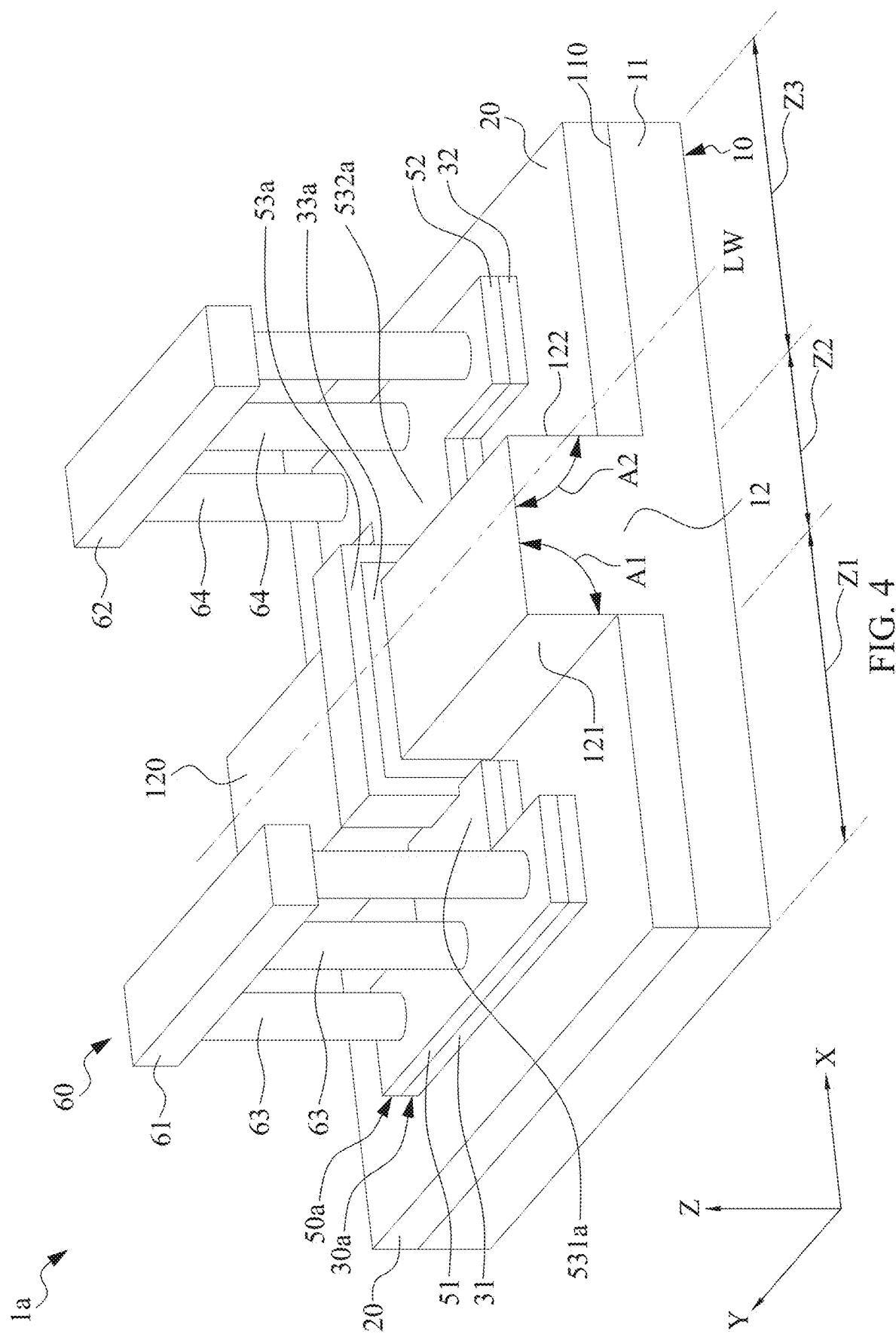
FIG. 4 is a schematic view of an optical device, in accordance with one or more embodiments of the present disclosure.

FIG. 4 is a schematic view of an optical device 1a, in accordance with one or more embodiments of the present disclosure. The components in FIG. 4 that use the same reference numerals as the components of FIG. 1 refer to the same components or equivalent components thereof. For the sake of brevity, it will not be repeated here. Differences between the optical device 1 and the optical device 1a include the light modulator 30 and the heating member 50 being replaced with light modulator 30a and the heating member 50a.

Figures 5A, 5B:
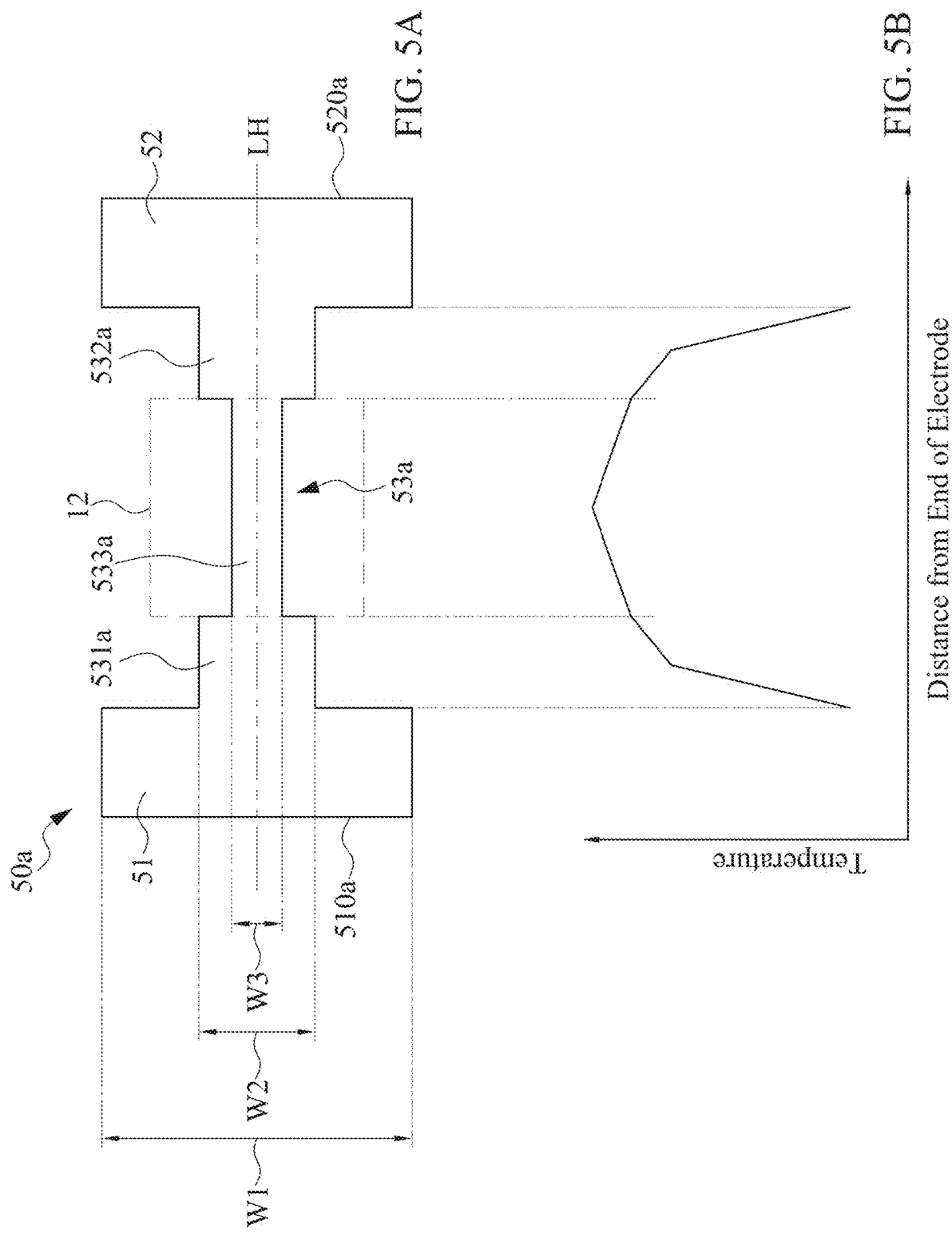
FIG. 5A is a schematic view of a heating member, in accordance with one or more embodiments of the present disclosure.
FIG. 5B is a diagram illustrating a temperature distribution on the heating member of FIG. 5A during its operation.

FIG. 5A is a schematic view of the heating member 50a, in accordance with one or more embodiments of the present disclosure. In some embodiments, the heating member 50a includes two electric contact segments 51 and 52 and one intermediate segment 53a. The two electric contact segments 51 and 52 are positioned at two ends 510a and 520a of the heating member 50 and arranged along a longitudinal axis LH. The intermediate segment 53a connects the two electric contact segments 51 and 52. In some embodiments, a width of the intermediate segment 53a varies in a traverse direction that is perpendicular to the longitudinal axis LH. Specifically, as shown in FIG. 5A, the intermediate segment 53a includes a heat concentration portion 533a and two connecting portions 531a and 532a. The two connecting portions 531a and 532a each connects one end of the heat concentration portion 533a to the electric contact segments 51 and 52. A width W2 of the two connecting portions 531a and 532a is greater than a width W3 of the heat concentration portion 533a in the traverse direction. In addition, a width W1 of the electric contact segments 51 and 52 is greater than the width W2 of the two connecting portions 531a and 532a.

Referring to FIGS. 3A and 5A, the heat concentration portion 533a has two ends farther away from the electric contact segments 51 and 52 compared to the bridge segment 53. As a result, the heat dissipation rate at the two end regions of the heat concentration portion 533a is higher than that at the two end regions of the bridge segment 53. Consequently, the intermediate segment 53a exhibits a more uniform temperature distribution, as shown in FIG. 5B, compared to the intermediate segment 53. The uniform temperature distribution on the intermediate segment 53a allows the light modulator 30 to be evenly heated, enabling the structural phase transition of the light modulator 30 even with lower power applied to the heating member 50a.

Referring FIG. 4 again, in some embodiments, the light modulator 30a includes one bridge segment 33a connected between the two extension segments 31 and 32. The light modulator 30a may be conformally formed with the heating member 50a, and thus has a similar geometric shape as that of the heating member 50a. However, it will be appreciated that many variations and modifications can be made to embodiments of the disclosure. In some other embodiments, the two extension segments 31 and 32 are omitted, and thus the two electric contact segments 51 and 52 are directly formed on the two cladding layers 20. In still some other embodiments, in addition to the two extension segments 31 and 32, the portion of the bridge segment 33a located under the connecting portions 531a and 532a are omitted, and thus the two electric contact segments 51 and 52 and the connecting portions 531a and 532a are directly formed on the two cladding layers 20.

Figure 6:
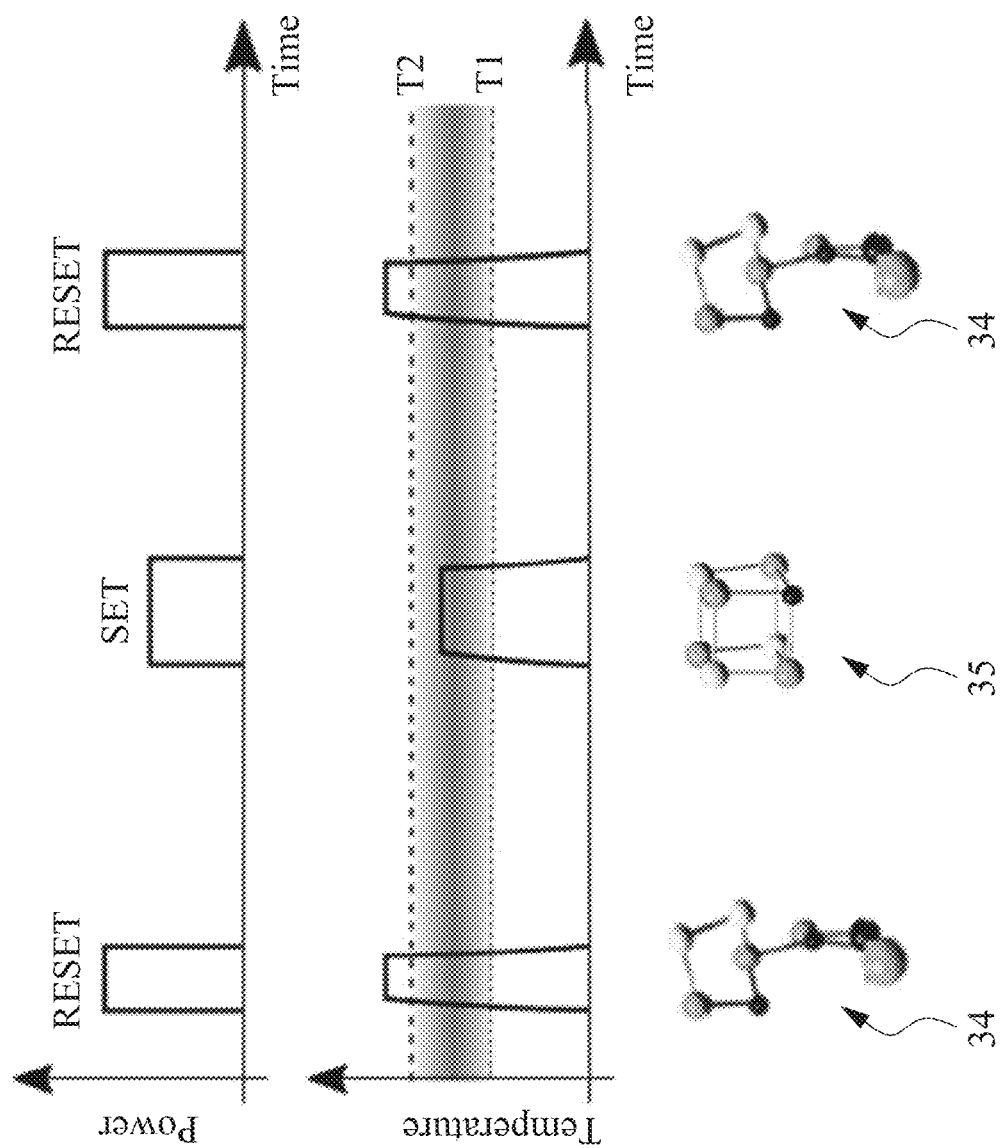
FIG. 6 illustrates pulse power scheme and transient thermal dynamics for changing the structural phase of a phase-change material.

FIG. 6 illustrates pulse power scheme and transient thermal dynamics for changing the structural phase of a phase-change material. Thanks to the nature of the phase-change material of the light modulator exhibits different optical transmission in the different structural phases, optical transmission of the phase-change material decreases from 95% in the case of aGST (GST in amorphous state) to 26% with cGST (GST in crystallized state.) In the present disclosure, to switch the structural state of the phase-change material, electrical pulse is applied to the heating member 50 or 50a (FIGS. 3A and 5A) and thus generates heat. The heat from the heating member 50 or 50a is transferred to the light modulator 30 thereby inducing a phase transition of the light modulator 30.

Generally, as shown in FIG. 6, a short and high-amplitude electrical pulse is used to melt-quench (i.e., temperature sharply rising above the melting temperature (T2) and quickly dissipates to room temperature) the phase-change material to an amorphous state 34. In contrast, a longer and lower amplitude electrical pulse is used to anneal the PCM with temperature ramping up between melting temperature (T2) and transition temperature (T1) for a certain period (to recrystallize the atomic lattice), before finally ramping the temperature down to room temperature. With the annealing process, the phase-change material is changed to a crystalline state 35. For application in photonic memory, the amorphous state is also referred to as a "RESET" state, and the crystalline state is also referred to as a "SET" state, in some embodiments. The "RESET" state corresponds to digital data "1" stored in a memory cell, and the "SET" state corresponds to digital data "0" stored in the memory cell.

According to Experimental results, transition temperature T1 is about 620 K to about 660 K with pulse time duration from 1 us down to 100 ns and T2 is about 900 K for GST.

Figure 8:
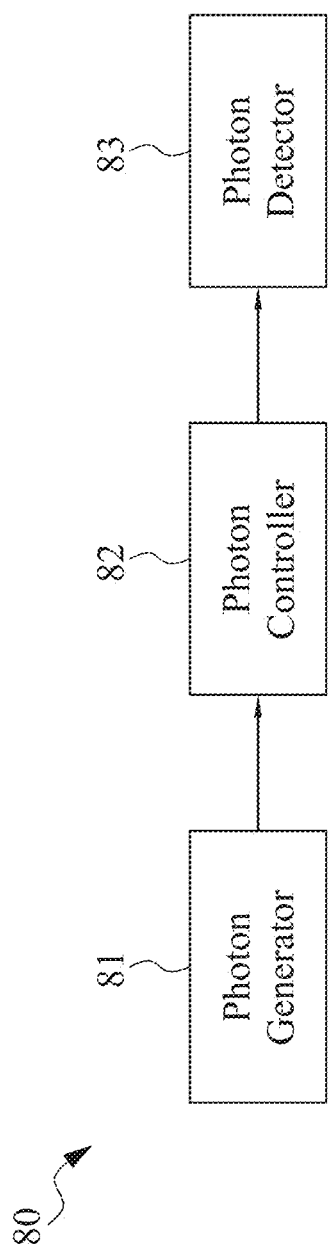
FIG. 8 is a block diagram of a computing system, in accordance with one or more embodiments of the present disclosure.

FIG. 8 is a block diagram of a computing system 80, in accordance with one or more embodiments of the present disclosure. The computing system 80 is configured to use light waves for data processing, data storage or data communication for computing. In accordance with some embodiments, the computing system 80 includes one or more photon generators 81, a photon controller 82 and a photon detector 83. The photon generators 81, the photon controller 82 and the photon detector 83 are coupled through optical fibers 84. Optical communication uses optical fibers 84 as a transmission medium. Optical fibers can be either multimode fibers (MMF), which case light coupling within the fiber but limit the transmission distance, or single-mode fibers (SMF), which allow long-distance transmissions for applications such as telecommunications. Light signal generated from the photon generators 81 is processed by the photon controller 82, and then is sent to the photon detector 83 for analyzing.

The photon generator 81 may be any suitable source of coherent light. In some embodiments, the photon generator 81 may be a diode laser or a vertical-cavity surface emitting lasers (VCSEL). In some embodiments, the photon generator 81 is configured to have an output power greater than 10 mW, greater than 25 mW, greater than 50 mW, or greater than 75 mW. In some embodiments, the photon generator 81 is configured to have an output power less than 100 mW. The photon generator 81 may be configured to emit a continuous wave of light or pulses of light ("optical pulses") at one or more wavelengths. The temporal duration of the optical pulses may be, for example, about 100 ps. Using multiple wavelengths of light allows some embodiments to be multiplexed such that multiple calculations may be performed simultaneously using the same optical hardware. Some embodiments may use two or more phase-locked light sources of the same wavelength at the same time to increase the optical power entering the optical encoder system.

The photon controller 82 is configured to regulate the amplitude or phase of the optical signals generated from the photon generator 81. Exemplary embodiment of the photon controller 82 will be described in detail with reference to FIGS. 16-18 below. The photon detector 83 receives the optical pulses from the photon controller 82. Each of the optical pulses is then converted to electrical signals. In some embodiments, the intensity and phase of each of the optical pulses is measured by optical detectors within the optical receiver. The electrical signals representing those measured values are then output to a processor (not shown in the figures).

Figure 9:
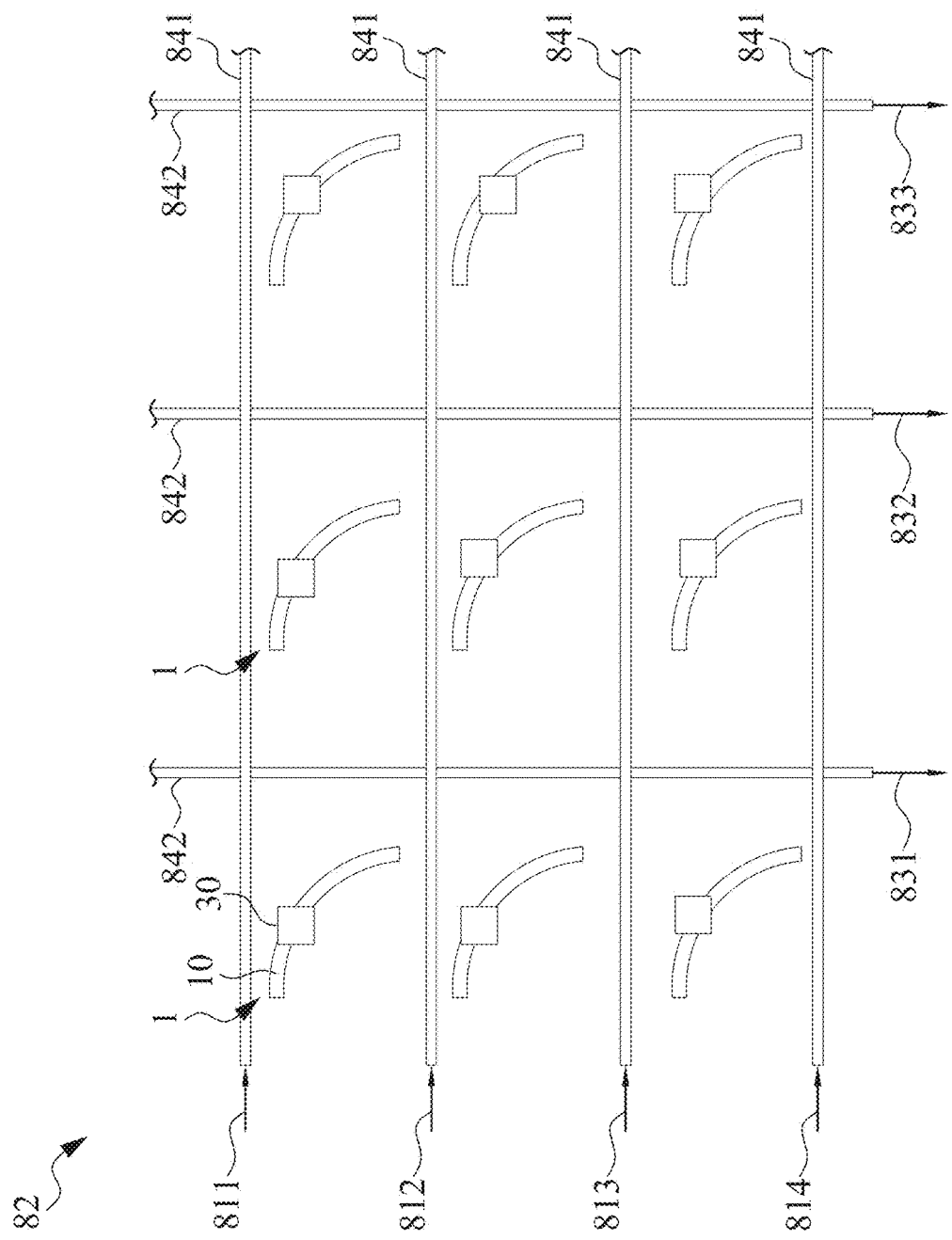
FIG. 9 is a schematic view of a photon controller, in accordance with one or more embodiments of the present disclosure.

FIG. 9 is a schematic view of a photon controller 82, in accordance with one or more embodiments of the present disclosure. In some embodiments, the photon controller 82 includes a number of traversal optical lines 841 and a number of longitudinal optical lines 842. The traversal optical lines 841 and the longitudinal optical lines 842 constitute an integrated 3×3 crossbar array chip. A number of optical devices 1 are positioned adjacent to intersections of the traversal optical lines 841 and the longitudinal optical lines 842. When light signals 811, 812, 813 and 814 enters the traversal optical lines 841, one part of the light is coupled into the waveguide 10 of the optical device 1 and then is coupled into the longitudinal optical lines 842, and the other part of light is output directly through the traversal optical lines 841. The light signals 831, 832 and 833 transmitted in the longitudinal optical lines 842 are then to be outputted from photon controller 82. The different phase states of the light modulators 30 attached on the waveguides 10 will affect the coupling coefficient in the coupling region of the waveguide 10 and the optical lines. By selecting the appropriate structural parameters of the light modulators 30, signals propagating in the horizontal direction are selectively coupled and multiplexed in optical lines along the vertical direction.

Figure 10:
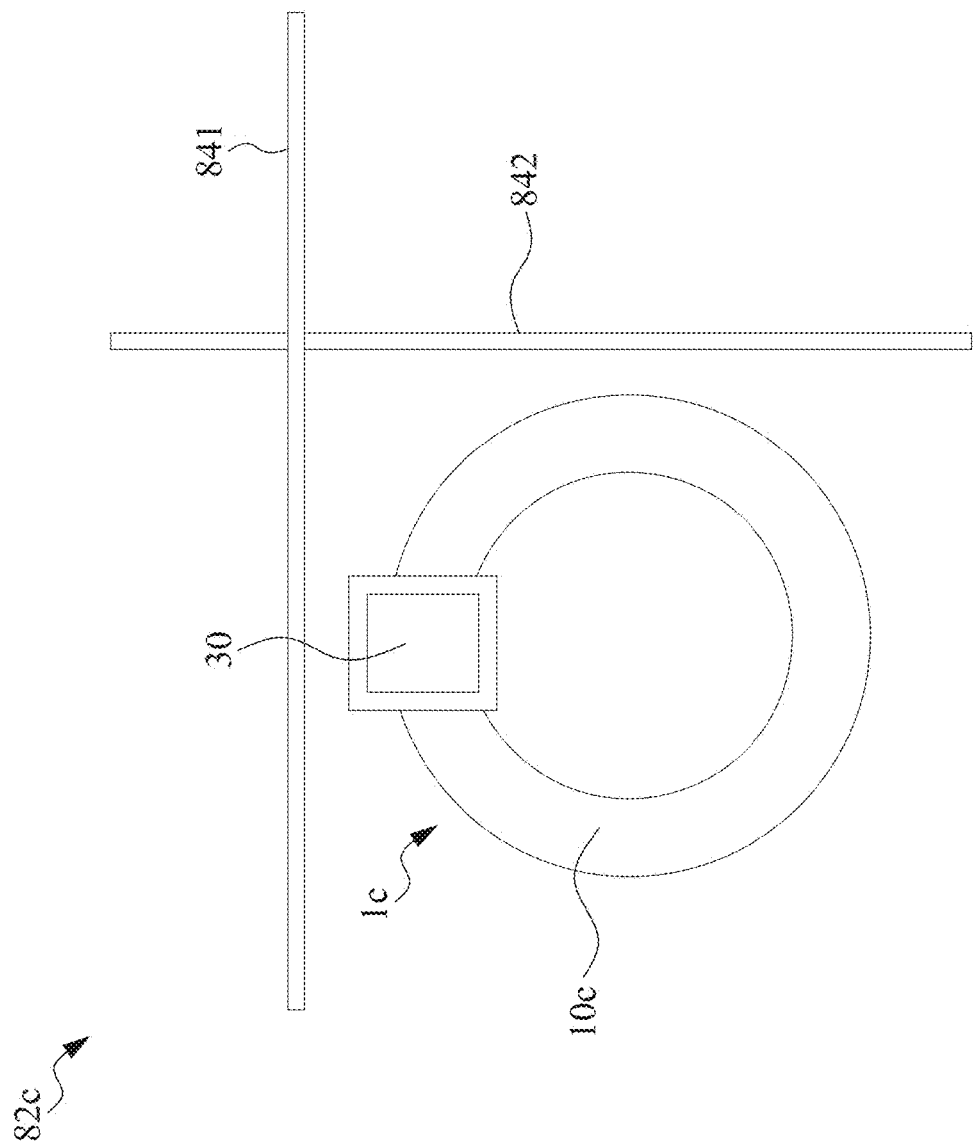
FIG. 10 is a schematic view of partial elements of a photon controller, in accordance with one or more embodiments of the present disclosure.

FIG. 10 is a schematic view of partial elements of a photon controller 82c, in accordance with one or more embodiments of the present disclosure. The components in FIG. 10 that use the same reference numerals as the components of FIG. 9 refer to the same components or equivalent components thereof. For the sake of brevity, it will not be repeated here. Differences between the photon controller 82c and the photon controller 82 include the optical device 1 being replaced with optical device 1c. In some embodiments, the optical device 1c is an optical ring resonator and includes a waveguide 10c and a light modulator 30 attached on the waveguide 10c. The waveguide 10c is a closed loop optical path and is coupled to the traversal optical lines 841 and the longitudinal optical lines 842. When light of the resonant wavelength is passed through the waveguide 10b from the traversal optical lines 841, the light builds up in intensity over multiple round-trips owing to constructive interference and is output to the longitudinal optical lines 842. Because a select few wavelengths will be at resonance within the waveguide 10c, the optical ring resonator may function as a filter.

Figure 11:
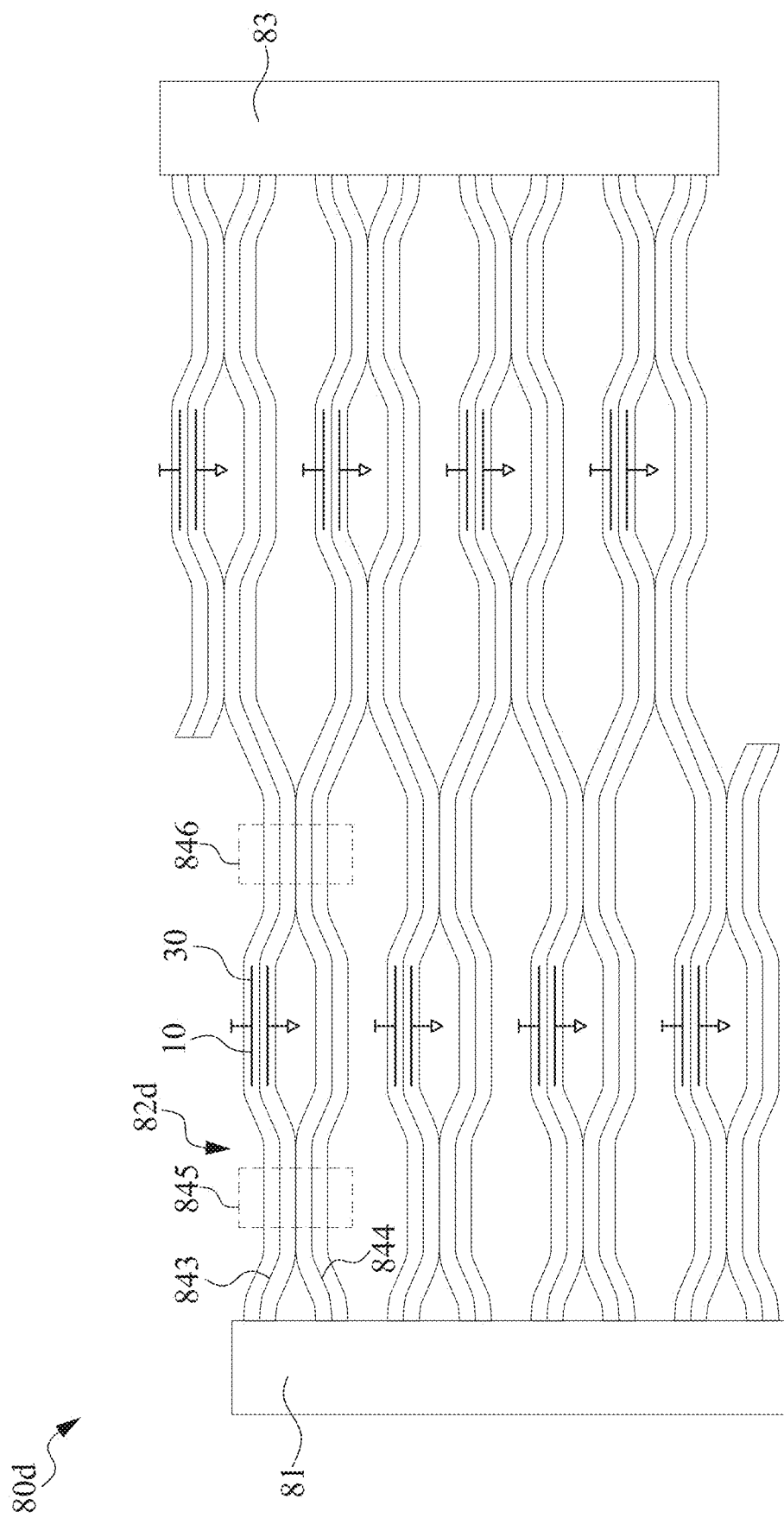
FIG. 11 is a schematic view of a computing system, in accordance with one or more embodiments of the present disclosure.

FIG. 11 is a schematic view of a computing system 80d, in accordance with one or more embodiments of the present disclosure. The computing system 80d is configured to use light waves for data processing, data storage or data communication for computing. In accordance with some embodiments, the computing system 80d includes one or more photon generators 81, a photon controller 82d and a photon detector 83. The photon controller 82d includes a number of optical lines, such as optical lines 843 and 844. The waveguide 10 is coupled to the optical line 843 and the light modulator 30 is attached to the waveguide 10. In some embodiments, the computing system 80d includes a first evanescent coupler 845 and a second evanescent coupler 846 for mixing the two input modes of the photon controller 82d. The light modulator 30 modulates the phase $\theta$ in optical line 843 of the photon controller 82d to create a phase difference between the two optical lines 843 and 844. Adjusting the phase $\theta$ causes the intensity of light output by the photon controller 82d to vary from one output mode of the photon controller 82d to the other thereby creating a beam splitter that is controllable and variable.

FIG. 12 is a flowchart illustrating a method S10 of fabricating an optical device, in accordance with one or more embodiments of the present disclosure. In some embodiments, the method S10 includes operation S11, in which waveguide, such as waveguide 10 in FIG. 2A, is formed. As shown in FIG. 1, the waveguide 10 extends along an optical axis LW, wherein the optical device 1 has a first zone Z1, a second zone Z2, and a third zone Z3 arranged in order along a direction that is perpendicular to the optical axis LW of the waveguide 10. The method S10 also includes operation S12, in which a layer of phase-change material, such as phase-change material 31 in FIG. 2C, is formed. The outer surface of the waveguide 10 relative to the second zone Z2 is covered by the layer of phase-change material. The method S10 further includes operation S13, in which a heating member, such heating member 50 in FIG. 2D, is formed on the layer of phase-change material. The heating member 50 extends from the first zone Z1 and terminates at the third zone Z3 by passing through the second zone Z2. A segment of the heating member 50 formed in the second zone Z2 is in direct contact with the layer of phase-change material.

Embodiments of the present disclosure provide an optical device and a method of fabricating the same. The optical device uses a light modulator to modulate the property of light that passes through the waveguide thereof. The light modulator is made of a phase-change material which exhibits different light transmissions in different temperatures and is connected to a heating member which produce heat while application of electrical current. Through efficiently and directly transferred the heat from the heating member to the phase-change material, light modulator operates with enhanced thermal efficiency, allowing for reliable and accurate structural phase transitions of the phase-change material.

One embodiment of the present disclosure provides an optical device which includes a waveguide and a light modulator. The light modulator comprising a bridge segment positioned on the waveguide, wherein the bridge segment comprises a phase-change material. The optical device also includes a heating member. The heating member includes an intermediate segment and two electric contact segments. The intermediate segment is in direct contact with the bridge segment of the light modulator. The two electric contact segments are connected to two ends of the intermediate segment, wherein heat produced from the heating member is directly transferred to the bridge segment of the light modulator thereby inducing a phase transition thereof.

Another embodiment of the present disclosure provides a method of fabricating an optical device. The method includes forming a waveguide extending along the optical axis. The optical device has a first zone, a second zone, and a third zone arranged in order along a direction that is perpendicular to the optical axis of the waveguide. The method also includes forming a layer of phase-change material on the waveguide. An outer surface of the waveguide relative to the second zone is covered by the layer of phase-change material. The method further includes forming a heating member that extends from the first zone and terminates at the third zone by passing through the second zone. A segment of the heating member formed in the second zone is in direct contact with the layer of phase-change material.

Yet another embodiment of the present disclosure provides a computing system. The computing system includes a photon generator configured to produce a light signal. The computing system also include a photon controller which include the optical device mentioned in the embodiment above. The computing system further includes a photon detector configured to receive the light signal from the photon controller.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, having a first zone, a second zone, and a third zone arranged in order in a traversal direction, the optical device comprising:
   a waveguide comprising a base portion and a rib portion, the rib portion extending from a top surface of the base portion relative to the second zone;
   a light modulator comprising:
      a bridge segment positioned on the rib portion of the waveguide; and
      two extension segments connected to two ends of the bridge segment and positioned relative to the first zone and the third zone, wherein the bridge segment and the two extension segments comprise a phase-change material; and
   a heating member comprising:
      an intermediate segment being in direct contact with the bridge segment of the light modulator; and
      two electric contact segments connected to two ends of the intermediate segment and positioned above the two extension segments, wherein heat produced from the heating member is directly transferred to the bridge segment and the two extension segments of the light modulator thereby inducing a phase transition thereof.

2. The optical device of claim 1, wherein the two electric contact segments of the heating member are in direct contact with the two extension segments of the light modulator.

3. The optical device of claim 2, wherein the heating member conformally covers the light modulator.

4. The optical device of claim 1, further comprising two cladding layers formed at two sides of the bridge segment, wherein the two extension segments of the light modulator are positioned on the two cladding layers.

5. The optical device of claim 1, wherein two electric contact segments are positioned at two ends in a longitudinal axis of the heating member, and a width of the intermediate segment varies in the traverse direction that is perpendicular to the longitudinal axis.

6. The optical device of claim 5, wherein the intermediate segment of the heating member comprises:
   a heat concentration portion being in contact with the bridge segment of the light modulator; and
   two intermediate portions connecting the heat concentration portion to the two electric contact segments, wherein a width of the two intermediate portions is greater than a width of the heat concentration portion in the traverse direction.

7. The optical device of claim 1, wherein the waveguides has at least two planes connected with an included angle, and the bridge segment of the light modulator covers the two planes of the waveguides.

8. The optical device of claim 1, wherein the phase-change material is configured to be switched between a disordered amorphous state and an ordered crystalline state which exhibit different refractive indices and extinction coefficients for the light travelling in the waveguide.

9. The optical device of claim 1, wherein the phase-change material comprises GeTe, $Ge_2Sb_2Te_5$ (GST), $Ge_2Sb_2Se_4Te_1$ (GSST), $Sb_2S_3$, or $Sb_2Se_3$.

10. The optical device of claim 1, wherein both the light modulator and the heating member are electrically conductive.

11. A method of fabricating an optical device, comprising:
   forming a waveguide extending along an optical axis, wherein the optical device has a first zone, a second zone, and a third zone arranged in order along a direction that is perpendicular to the optical axis of the waveguide, wherein the waveguide comprises a base portion and a rib portion, the rib portion extends from a top surface of the base portion relative to the second zone;

forming a layer of phase-change material on the waveguide, wherein the layer of phase-change material comprises:
  a bridge segment, positioned on the rib portion of the waveguide; and
  two extension segments connected to two ends of the bridge segment and positioned relative to the first zone and the third zone, wherein an outer surface of the waveguide relative to the second zone is covered by the bridge segment of the layer of phase-change material; and forming a heating member that extends from the first zone and terminates at the third zone by passing through the second zone, wherein an intermediate segment of the heating member formed in the second zone is in direct contact with the layer of phase-change material, and two electric contact segments of the heating member formed in the first zone and the third zone are positioned above the two extension segments.

12. The method of claim 11, wherein the two electric contact segments of the heating member formed in the first zone and the third zone are in direct contact with the two extension segments.

13. The method of claim 11, wherein both the layer of phase-change material and the heating member are electrically conductive.

14. The method of claim 11, further comprising forming two cladding layers, which have a refractive index smaller than a refractive index of the waveguide, on the waveguide relative to the first zone and the third zone before the formation of the layer of phase-change material, wherein the two extension segments located in the first zone and the second zone and are formed on the two cladding layers.

15. The method of claim 11, wherein the layer of phase-change material comprises GeTe, $Ge_2Sb_2Te_5$ (GST), $Ge_2Sb_2Se_4Te_1$ (GSST), $Sb_2S_3$, or $Sb_2Se_3$.

16. The method of claim 11, wherein the outer surface of the waveguide in the second zone comprises at least two planes connected with an included angle, and the bridge segment of the layer of phase-change material covers the two planes of the outer surface.

17. A computing system, comprising:
a photon generator configured to produce a light signal;
a photon controller configured to modulate the light signal from the photon generator and comprising:
  a waveguide having a first zone, a second zone, and a third zone arranged in order in a traversal direction, wherein the waveguide comprises a base portion and a rib portion, the rib portion extends from a top surface of the base portion relative to the second zone;
  a light modulator comprising:
    a bridge segment positioned on the rib portion of the waveguide; and
    two extension segments connected to two ends of the bridge segment and positioned relative to the first zone and the third zone, wherein the bridge segment and the two extension segments comprise a phase-change material; and
  a heating member comprising:
    an intermediate segment being in direct contact with the bridge segment of the light modulator; and
    two electric contact segments connected to two ends of the intermediate segment and positioned above the two extension segments, wherein heat produced from the heating member is directly transferred to the bridge segment and the two extension segments of the light modulator thereby inducing a phase transition thereof; and
a photon detector configured to receive the light signal from the photon controller.

18. The computing system of claim 17, further comprising a photonic circuit connected between the photon generator and the photon detector, wherein the waveguide of the photon controller is positioned adjacent to the photonic circuit with a spacing formed between the waveguide and the phonic circuit.

19. The computing system of claim 18, wherein the waveguide forms a closed loop optical path, and the light modulator and the heating member are disposed on the closed loop optical path.

20. The computing system of claim 17, further comprising two light traveling paths extending from the photon generator to the photon detector, wherein the waveguide forms a segment of one of the two light traveling path.

* * * * *